United States Patent
Kim et al.

(10) Patent No.: US 8,261,313 B2
(45) Date of Patent: Sep. 4, 2012

(54) MOBILE COMMUNICATION TERMINAL AND METHOD OF TRANSMITTING BROADCAST VIEWING INFORMATION THEREOF

(75) Inventors: Suk Kun Kim, Incheon-si (KR); Sung Chae Na, Seoul (KR)

(73) Assignee: LG Electronics Inc., Seoul (KR)

( * ) Notice: Subject to any disclaimer, the term of this patent is extended or adjusted under 35 U.S.C. 154(b) by 947 days.

(21) Appl. No.: 11/775,161

(22) Filed: Jul. 9, 2007

(65) Prior Publication Data

US 2008/0022316 A1 Jan. 24, 2008

(30) Foreign Application Priority Data

Jul. 7, 2006 (KR) .................. 10-2006-0064006

(51) Int. Cl.
*H04N 7/173* (2011.01)
(52) U.S. Cl. .................. 725/116; 725/105; 725/114
(58) Field of Classification Search ............... 725/9, 16, 725/54, 115–117
See application file for complete search history.

(56) References Cited

U.S. PATENT DOCUMENTS

| | | | | |
|---|---|---|---|---|
| 5,600,573 A * | 2/1997 | Hendricks et al. | ............ | 725/109 |
| 5,844,620 A * | 12/1998 | Coleman et al. | ................ | 725/54 |
| 5,857,190 A * | 1/1999 | Brown | ............ | 707/10 |
| 6,160,545 A * | 12/2000 | Eyer et al. | ............ | 715/721 |
| 6,173,330 B1 * | 1/2001 | Guo et al. | ............ | 709/232 |
| 6,298,482 B1 * | 10/2001 | Seidman et al. | ............ | 725/101 |
| 6,452,943 B1 * | 9/2002 | Furuya | ............ | 370/468 |
| 6,507,950 B1 * | 1/2003 | Tsukidate et al. | ............ | 725/54 |
| 6,751,401 B1 * | 6/2004 | Arai et al. | ............ | 386/291 |
| 6,782,553 B1 * | 8/2004 | Ogawa et al. | ............ | 725/146 |
| 2005/0160168 A1 * | 7/2005 | Takanashi et al. | ............ | 709/224 |

FOREIGN PATENT DOCUMENTS

KR 1020050029937 3/2005

OTHER PUBLICATIONS

ETSI, "Digital Audio Broadcasting (DAB); DMB video service; User Application Specification", Jun. 2005, ETSI TS 102 428 v1.1.1.*
ETSI, "Digital Video Broadcasting (DVB); Transmission System for Handheld Terminals (DVB-H)", Nov. 2004, ETSI EN 302 304 v1.1.1.*

* cited by examiner

*Primary Examiner* — Nicholas Corbo
(74) *Attorney, Agent, or Firm* — Lee, Hong, Degerman, Kang & Waimey

(57) ABSTRACT

A mobile communication terminal and method of transmitting broadcast viewing information thereof are disclosed. The mobile communication terminal includes a broadcast module configured to receive a broadcast program, an information collecting unit configured to collect and manage the broadcast viewing information for the received broadcast program, a transmitting unit configured to transmit the broadcast viewing information to a broadcast managing server according to a transmission cycle, a receiving unit configured to receive a change request message for the transmission cycle from the broadcast managing server, and a control unit configured to change the transmission cycle according to the change request message, and control the transmitting unit to transmit the broadcast viewing information to the broadcast managing server in the changed transmission cycle.

19 Claims, 4 Drawing Sheets

| Field | Size(Byte) | Value | Parameter Name |
|---|---|---|---|
| Interval | 1 | "1" = 0~9 | DVB_LOG_SW |
| Enable/Disable | 1 | "1" / "0" | DVB_LOG_FL |
| Frequency | 4 | "nnnn" n = 0~9 | DVB_LOG_DF |
| Link | 512 | URL | DVB_LOG_URL |

| Field | Size(Byte) | Value | Parameter Name |
|---|---|---|---|
| Interval | 1 | "1" = 0~9 | DVB_LOG_SW |
| Enable/Disable | 1 | "1" / "0" | DVB_LOG_FL |
| Frequency | 4 | "nnnn" n = 0~9 | DVB_LOG_DF |
| Link | 512 | URL | DVB_LOG_URL |

MOBILE COMMUNICATION TERMINAL AND METHOD OF TRANSMITTING BROADCAST VIEWING INFORMATION THEREOF

This application claims the priority benefit of the Korean Patent Application No. 10-2006-0064006, filed on Jul. 7, 2006, which is hereby incorporated by reference as if fully set forth herein.

BACKGROUND OF THE INVENTION

1. Field of the Invention

The present invention relates to a mobile communication terminal capable of receiving a broadcast program, and more particularly, to a mobile communication terminal and method of transmitting broadcast viewing information thereof.

2. Discussion of the Related Art

Generally, a mobile communication terminal according to a related art receives a broadcast program using a broadcasting system in case of having a broadcast module for receiving broadcast programs.

In this case, the broadcasting system means such a digital broadcasting system as DMB (digital multimedia broadcasting), DVB-H (digital video broadcast-handheld), Media FLO (forward link only), and the like.

Yet, there is a broadcasting system providing a unidirectional service to a mobile communication terminal from a broadcasting network only. So, the broadcasting system, which provides the unidirectional service, is able to transmit a broadcast signal and associated data to the mobile communication terminal using a broadcast channel but incapable of being provided with any data from the mobile communication terminal.

Meanwhile, a broadcasting system, which provides a bi-directional service, can be provided with data according to a transmission cycle previously set in a mobile communication terminal.

However, it is unable to arbitrarily change the transmission cycle, which was preset in the course of manufacturing the mobile communication terminal, while the mobile communication terminal is in use.

SUMMARY OF THE INVENTION

Accordingly, the present invention is directed to a mobile communication terminal and method of transmitting broadcast viewing information thereof that substantially obviate one or more problems due to limitations and disadvantages of the related art.

An object of the present invention is to provide a mobile communication terminal and method of transmitting broadcast viewing information thereof, by which broadcast viewing information associated with a broadcast program received by the mobile communication terminal can be transmitted to a broadcast managing server.

Another object of the present invention is to provide a mobile communication terminal and method of transmitting broadcast viewing information thereof, by which the broadcast viewing information is transmittable according to a transmission cycle requested by a broadcast managing server.

A further object of the present invention is to provide a mobile communication terminal and method of transmitting broadcast viewing information thereof, by which the broadcast viewing information is independently transmittable in a currently set transmission cycle if a broadcast managing server makes a request for a transmission of the broadcast viewing information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal of transmitting broadcast viewing information according to the present invention includes a broadcast module configured to receive a broadcast program, an information collecting unit configured to collect and manage the broadcast viewing information for the received broadcast program, a transmitting unit configured to transmit the broadcast viewing information to a broadcast managing server according to a transmission cycle, a receiving unit configured to receive a change request message for the transmission cycle from the broadcast managing server, and a control unit configured to change the transmission cycle according to the change request message, and control the transmitting unit to transmit the broadcast viewing information to the broadcast managing server in the changed transmission cycle.

In another aspect of the present invention, a method of transmitting broadcast viewing information in a mobile communication terminal includes collecting and managing broadcast viewing information for a broadcast program, receiving a change request message for a transmission cycle of the broadcast viewing information from a broadcast managing server, changing the transmission cycle using information included in the change request message, and transmitting the broadcast viewing information to the broadcast managing server in the changed transmission cycle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
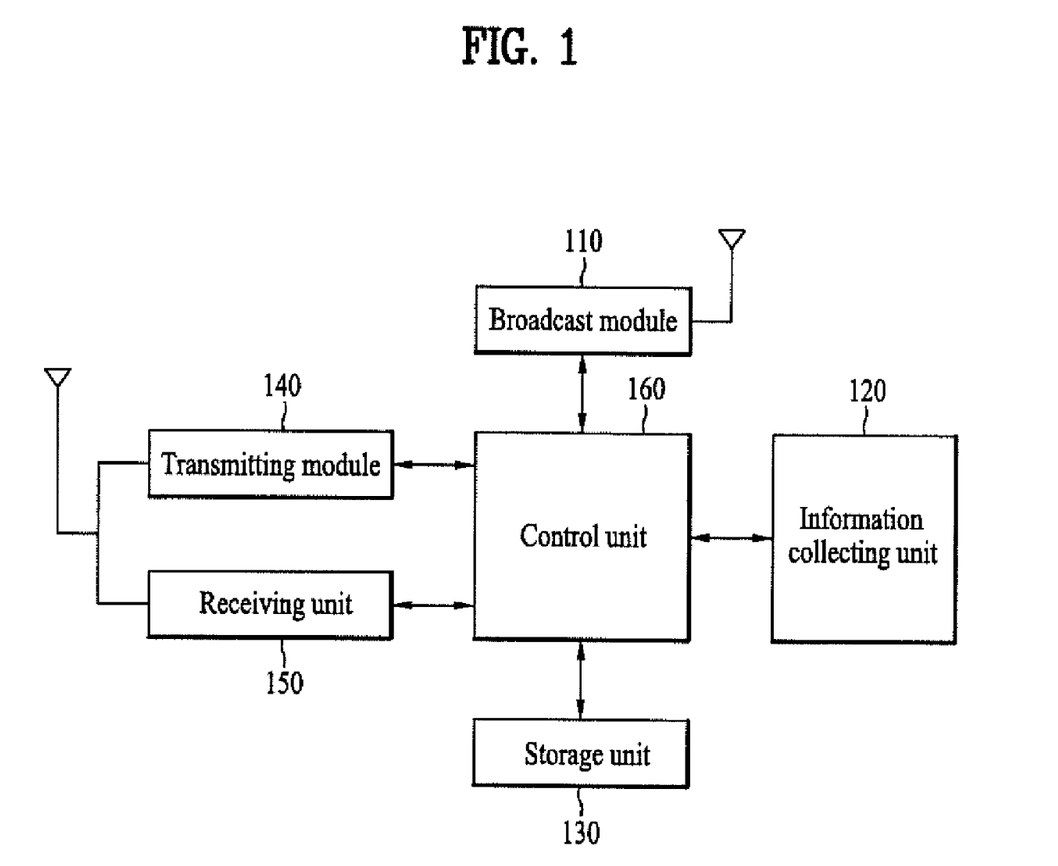
FIG. 1 is a block diagram of a mobile communication terminal of transmitting broadcast viewing information according to one embodiment of the present invention.

FIG. 1 is a block diagram of a mobile communication terminal of transmitting broadcast viewing information according to one embodiment of the present invention.

Referring to FIG. 1, the mobile communication terminal includes a broadcast module 110, an information collecting unit 120, a storage unit 130, a transmitting unit 140, a receiving unit 150, and a control unit 160.

The broadcast module 110 receives a broadcast program and various data using a broadcasting system. More specifically, the broadcast module 110 receives the broadcast program and data through at least one broadcast channel. Here, the broadcasting system can refer to a digital broadcasting system as DMB (digital multimedia broadcasting), DVB-H (digital video broadcast-handheld), Media FLO (forward link only), and the like. Moreover, the broadcast module 110 can refer to a module suitable for receiving the broadcast program and data transmitted from the digital broadcasting system.

The information collecting unit 120 collects and manages viewing information for the received broadcast program (hereinafter, referred to as 'broadcast viewing information').

For instance, the broadcast viewing information includes at least one of viewing broadcast program information, viewing broadcast channel information, viewing time information by broadcast program, viewing time information by broadcast channel, and information for product purchase contents via broadcast program. In particular, the broadcast viewing information includes information indicating what broadcast program and/or broadcast channel a user is viewing or how long a user views each broadcast program or each broadcast channel.

Furthermore, if a broadcast program being viewed is a home shopping broadcast program for selling products/services, the broadcast viewing information includes information of products/services purchased via the broadcast program by a user while the broadcast program is being viewed. In addition, the broadcast viewing information can include information related to selected products, marked-for-purchase products, interested products, among other various information.

Further, the information collecting unit 120 collects and manages the broadcast viewing information in a predetermined cycle. For instance, the information collecting unit 120 can collect and manage the broadcast viewing information according to a cycle arbitrarily set by a user or a default cycle set by manufacturer and/or programmer. Alternatively, the cycle can be set by a request made by a broadcast managing server.

The information collecting unit 120 can randomly collect the broadcast viewing information and then manages the collected information. For instance, the information collecting unit 120 can collect the broadcast viewing information whenever a request is made by the broadcast managing server.

Here, the broadcast managing server refers to a server that stores and manages broadcast viewing information received from the mobile communication terminal on the broadcasting system or a mobile communication system. The broadcast managing server can be included in a server responsible for a transmission of a broadcast program to the mobile communication terminal. Alternatively, the broadcast managing server can be provided separately from the server responsible for a transmission of a broadcast program.

The storage unit 130 stores all kinds of data inputted/outputted via the mobile communication terminal and various programs to execute functions set in the mobile communication terminal.

In particular, the storage unit 130 stores at least one of information associated with a transmission cycle of the broadcast viewing information and address information for a broadcast managing server that receives the broadcast viewing information.

Furthermore, the storage unit 130 stores broadcast viewing information collected by the information collecting unit 120.

The transmitting unit 140 transmits the broadcast viewing information to the broadcast managing server according to a transmission cycle.

The transmitting unit 140 can transmit the broadcast viewing information to the broadcast managing server using a return channel. In this case, the return channel can refer to a mobile communication channel or a broadcast channel. In particular, in case that the broadcast viewing information is transmitted via the broadcast channel, the broadcast viewing information can be transmitted by the broadcast module 110.

In general, the transmission cycle can refer to a transmission cycle that is set to a default in the course of manufacturing the mobile communication terminal. Yet, according to the present invention, the transmission cycle can mean a transmission cycle changed from a previously set transmission cycle as a change request message for a transmission cycle is received from the broadcast managing server. A process for changing a transmission cycle according to the change request message for the transmission cycle will be explained in detail later.

Further, the transmitting unit 140 can transmit the broadcast viewing information independently from a currently set transmission cycle.

In case that a transmission request message for broadcast viewing information is received by the receiving unit 150, the transmitting unit 140 transmits the broadcast viewing information to a server independently from the currently set transmission cycle according to a control signal of the control unit 160. In this case, the transmission request message includes address information for the server that attempts to receive the broadcast viewing information.

As such, the transmitting unit 140 transmits the broadcast viewing information to the server having the address information included in the transmission request message. In case that the address information included in the transmission request message is identical to address information for a broadcast managing server stored in the storage unit 130, the transmitting unit 140 transmits the broadcast viewing information to the broadcast managing server.

The receiving unit 150 receives a change request message for a transmission cycle of the broadcast viewing information from the broadcast managing server.

The change request message is the message transmitted to the broadcast managing server from the mobile communication terminal. Moreover, the change request message is the message to provide information for adjusting the transmission cycle of the broadcast viewing information.

For instance, the receiving unit 150 can receive the change request message via a data channel among broadcast channels or a mobile communication channel. In particular, in case that the change request message is received via the data channel, the change request message can be received by the broadcast module 110. Information included in the change request message and a transmission cycle changing process using the information will be explained in detail later.

And, the receiving unit 150 receives a transmission request message for the broadcast viewing information from the broadcast managing server.

The transmission request message is the message for requesting that the broadcast viewing information shall be immediately transmitted. Moreover, the transmission request message includes address information for a server that attempts to receive the broadcast viewing information. In this case, the address information may be identical to the address information of the broadcast managing server previously stored in the storage unit 130 or may correspond to address information for a server newly requested by the transmission request message.

The control unit 160 controls overall functions and operations of the mobile communication terminal, and more particularly, an operation associated with the transmission of the broadcast viewing information.

In particular, according to the present invention, the control unit 160 controls the transmitting unit 140 to change a previously set transmission cycle according to the change request message for the broadcast viewing information and transmit the broadcast viewing information to the broadcast managing server according to the changed transmission cycle.

Figure 4:
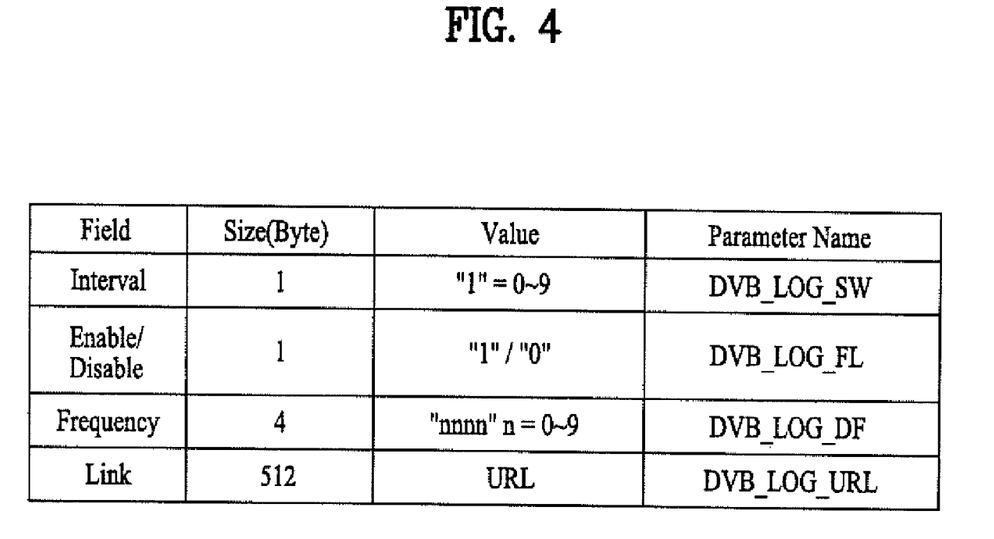
FIG. 4 is a structural diagram of a request message for changing a transmission cycle according to an embodiment of the present invention.

The change request message, as shown in FIG. 4, includes parameters associated with the transmission cycle.

Explained in the following description is an example that the change request message is a message (hereinafter named 'OTA message') that includes OTA (over-the-air) provisioning parameters in a DVB-H system.

The OTA message includes four kinds of fields, and more particularly, an interval field, an enable/disable field, a frequency field, and a link field.

The enable/disable field defines information indicating whether a transmission of broadcast viewing information is requested and has a parameter name of DVB_LOG_FL (flag). In this case, if the enable/disable field is set to 0, it means that the broadcast viewing information is not to be transmitted. If the enable/disable field is set to 1, it means that the broadcast viewing information is to be transmitted.

The frequency field defines a basic transmission cycle of the broadcast viewing information and has a parameter name of DVB_LOG_DF (default frequency). In this case, the transmission cycle is a value determined by the broadcast managing server and may have a unit of time or day.

The interval field defines an adjustment value for a basic transmission cycle and has a parameter name of DVB_LOG_SW (sending window).

For instance, if a basic transmission cycle defined by the frequency field is 168 hours and if an adjustment value defined by the interval field is 3 hours, the control unit 160 decides the transmission cycle as 171 hours resulting from adding the adjustment value 3 hours to the basic transmission cycle 168 hours. Therefore, if a transmission cycle previously set in the mobile communication terminal is 168 hours, the control unit 160 should change the transmission cycle into 171 hours according to the information included in the change request message.

Furthermore, the link field includes address information for a server attempting to receive the broadcast viewing information and has a parameter name DVB_LOG_URL. In this case, the address information is normally represented as URL.

For instance, the control unit 160 can be used to determine whether the address information included in the link field is matched to the address information previously set in the mobile communication terminal. If it is determined that the address information included in the link field does not match with the address information previously set in the mobile communication terminal, the control unit 160 sets the address information included in the link field to address information for a server to which the broadcast viewing information will be transmitted. On the other hand, if it is decided that the address information included in the link field matches to the address information previously set in the mobile communication terminal, the control unit 160 maintains the previously set address information intact.

Further, the control unit 160 controls the transmitting unit 140 to transmit the broadcast viewing information according to the changed transmission cycle and the server address information.

Specifically, in the present invention, the control unit 160 controls the transmitting unit 140 to transmit the broadcast viewing information independently from a currently set transmission cycle according to the transmission request message for the broadcast viewing information.

The transmission request message is the message for requesting an immediate transmission of the broadcast viewing information and includes address information of a server attempting to receive the broadcast viewing information.

For instance, the control unit 160 can be used to determine whether the address information included in the transmission request message is matched to the previously set address information. If it is determined that they match, the control unit 160 maintains the previously set information intact. On the other hand, if it is determined that they do not match, the address information included in the transmission request message is managed separate from the previously set address information or the previously set address information can be changed into the address information included in the transmission request message.

Hence, the control unit 160 can control the transmitting unit 140 to transmit the broadcast viewing information to the server corresponding to the address information included in the transmission request message.

The control unit 160 can control the transmitting unit 140 to transmit the broadcast viewing information to the server corresponding to the address information included in the transmission request message as soon as the transmission request message is received or right after the transmission request message has been received.

A method of transmitting broadcast viewing information in a mobile communication terminal according to the present invention is explained in detail with reference to FIG. 2 as follows.

Figure 2:
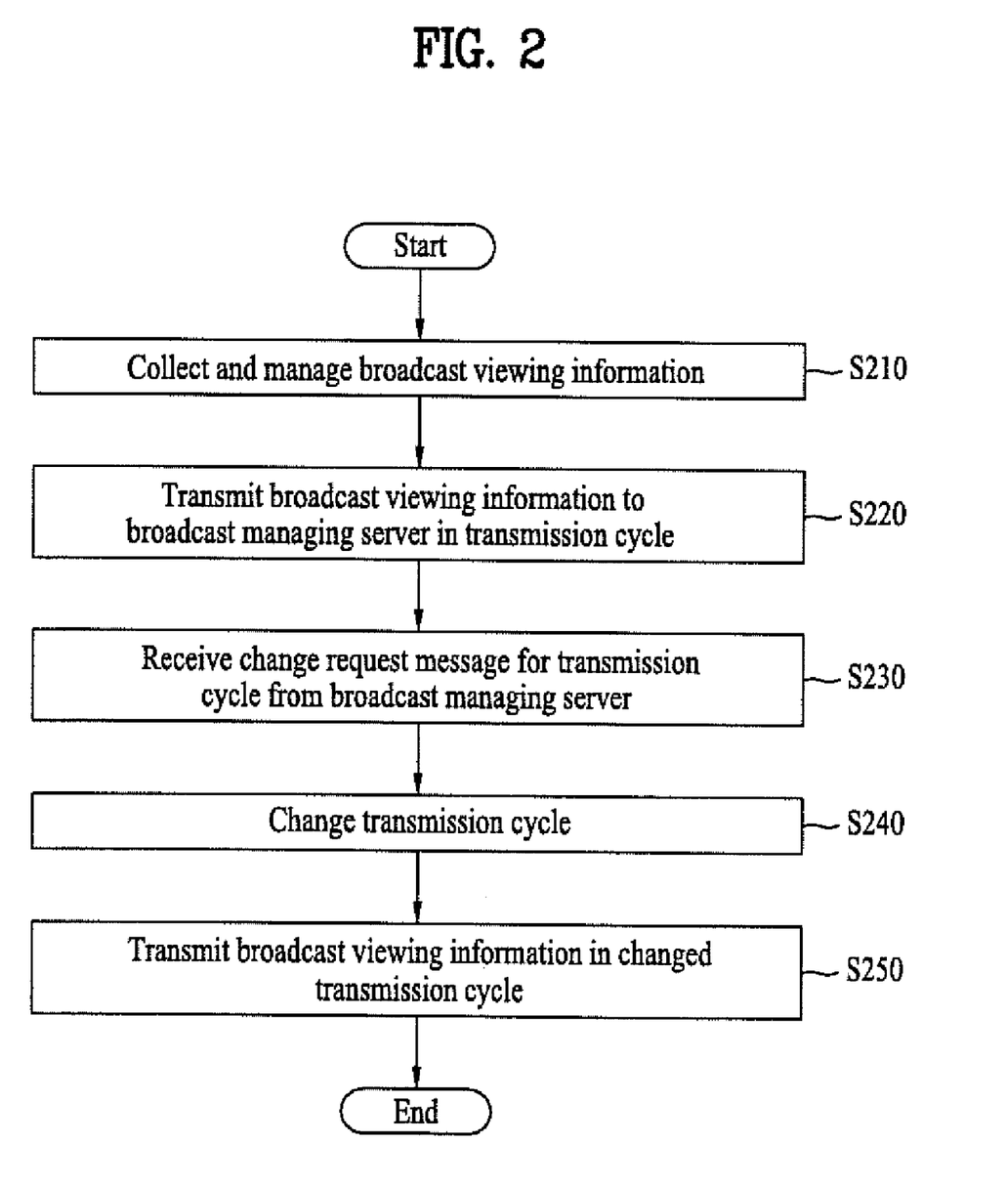
FIG. 2 is an exemplary flowchart illustrating a method of transmitting broadcast viewing information in a mobile communication terminal according to one embodiment of the present invention.

FIG. 2 is an exemplary flowchart illustrating a method of transmitting broadcast viewing information in a mobile communication terminal. Here, the mobile communication terminal is assumed to have the same elements shown in FIG. 1.

Referring to FIG. 2, the information collecting unit 120 can collect (or gather) and manage broadcast viewing information for a broadcast program received via the mobile communication terminal (S210). Here, the broadcast program refers to a broadcast program such as a digital broadcasting system as DMB (digital multimedia broadcasting), DVB-H (digital video broadcast-handheld), Media FLO (forward link only), and the like.

Furthermore, the broadcast viewing information includes information indicating which broadcast program or broadcast channel a user is currently viewing via the mobile communication terminal or information indicating how long a user views each broadcast program or each broadcast channel. In addition, if the user is viewing an infomercial (e.g., home shopping network), the broadcast viewing information can include information of a list of products purchased via the broadcast program by the user while the user views the broadcast program, for example.

The transmitting unit 140 can transmit the broadcast viewing information to the broadcast managing server according to a preset (or pre-configured) transmission cycle (S220).

The transmitting unit 140 can transmit the broadcast viewing information to the broadcast managing server using a return channel (e.g., a mobile communication channel or a broadcast channel). In particular, for example, if the broadcast viewing information is transmitted via the broadcast channel, the broadcast viewing information can be transmitted by the broadcast module 110.

The receiving unit 150 can receive a change request message for a transmission cycle of the broadcast viewing information from the broadcast managing server (S230). That is, the mobile communication terminal can receive a request message from the broadcast managing server requesting (or instructing) the mobile communication terminal to change the transmission cycle. The change request message includes information necessary for adjusting (or controlling) the transmission cycle of the broadcast viewing information.

For instance, the receiving unit 150 can receive the change request message via a data channel of the broadcast channel or via a mobile communication channel. In particular, if the change request message is received via the data channel, the change request message can be received by the broadcast module 110, for example.

The control unit 160 can change the preset transmission cycle according to the change request message.

As shown in FIG. 4, the change request message can include parameters associated with the transmission cycle. Details of the change request message are explained above with reference to FIG. 4.

The control unit 160 can change (or modify) the preset transmission cycle using the transmission cycle information and transmission cycle interval value included in the change request message (S240). Moreover, the control unit 160 can also determine each transmission cycle interval.

Furthermore, the control unit 160 can determine whether the address information included in the change request message matches or corresponds to the preset address information. If the addresses do not match, the control unit 160 changes the preset address information to the address information included in the change request message. If the addresses match, then the control unit 160 maintains the preset address information.

Thereafter, the transmitting unit 140 can transmit the broadcast viewing information according to the changed transmission cycle (S250).

Here, according to the control signal of the control unit 160, the transmitting unit 140 can transmit the broadcast viewing information to the server which corresponds to at least one of the preset address information of the broadcast managing server and the server address information included in the change request message.

Figure 3:
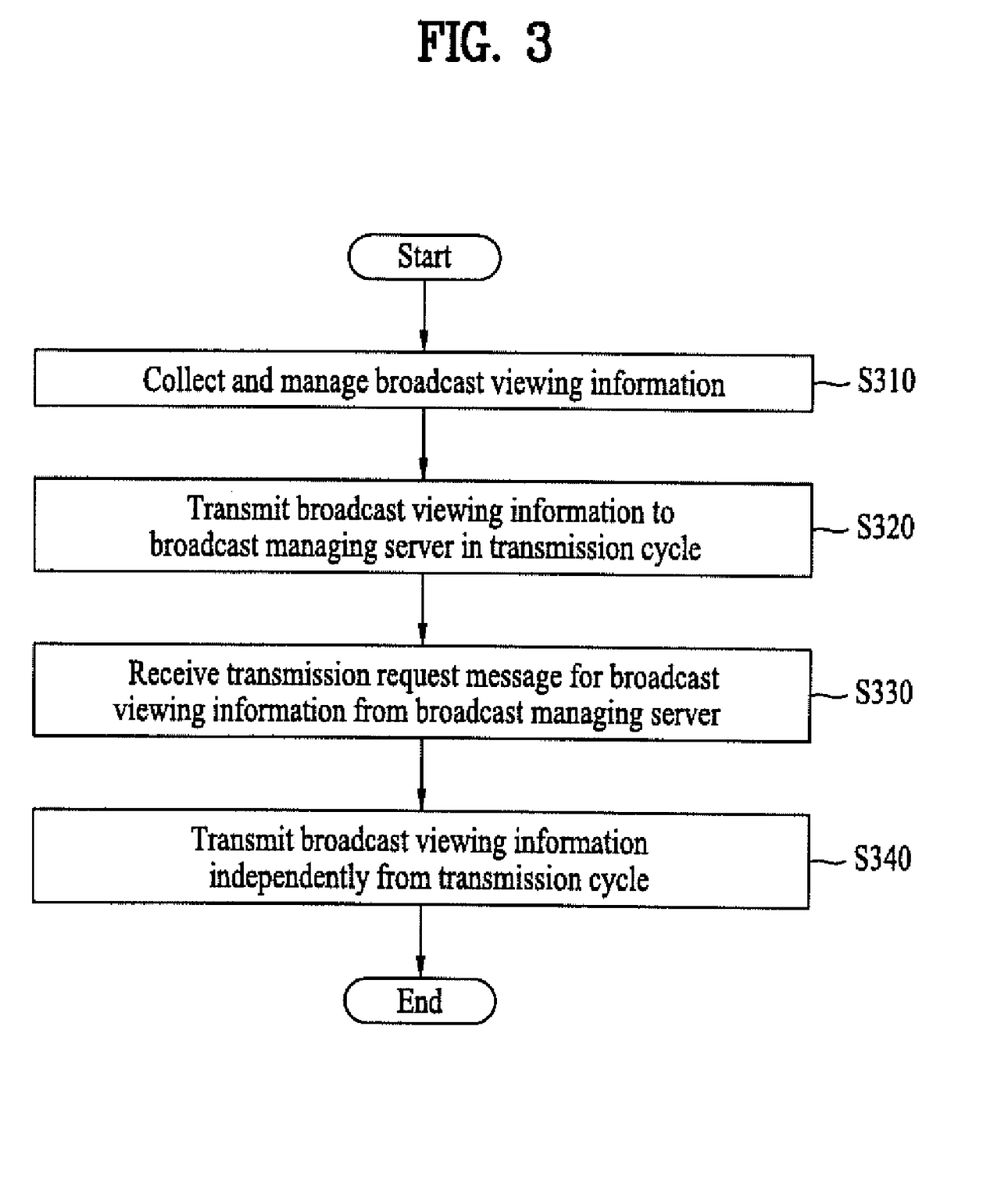
FIG. 3 is an exemplary flowchart illustrating a method of transmitting broadcast viewing information in a mobile communication terminal according to another embodiment of the present invention.

FIG. 3 is an exemplary flowchart illustrating a method of transmitting broadcast viewing information in a mobile communication terminal according to another embodiment of the present invention. Here, the mobile communication terminal is assumed to have the same elements shown in FIG. 1.

Referring to FIG. 3, the information collecting unit 120 can collect (or gather) and manage broadcast viewing information for the broadcast program received via the mobile communication terminal (S310). The viewing information collecting and managing step S310 is identical to step S210 shown in FIG. 2. As such, the details will be omitted in the following description.

The transmitting unit 140 can transmit the broadcast viewing information to the broadcast managing server according to the preset (or pre-configured) transmission cycle (S320).

Again, the transmitting step S320 is identical to the step S220 shown in FIG. 2. As such, the details will be omitted in the following description.

The receiving unit 150 can receive a transmission request message for the broadcast viewing information from the broadcast managing server (S330). The transmission request message is a message requesting immediate transmission of the broadcast viewing information. The transmission request message can further include address information for a broadcast managing server which seeks to receive the broadcast viewing information. In this case, the address information may be identical to address information previously stored in the storage unit 130.

The transmitting unit 140 can transmit the broadcast viewing information independent from the preset transmission cycle according to a control signal of the control unit 160 (S340).

The control unit 160 can determine whether the address information included in the transmission request message matches or corresponds to the previously set (or configured) address information. If the addresses match, the control unit 160 maintains the previously set information. On the other hand, if the addresses do not match, the address information included in the transmission request message is managed separate from the previously set address information or the previously set address information can be changed to the address information included in the transmission request message.

Furthermore, the control unit 160 controls the transmitting unit 140 to transmit the broadcast viewing information immediately upon receipt of the transmission request message. That is, the control unit 160 can temporarily ignore the existing transmission cycle and transmit the broadcast viewing information immediately.

The transmitting unit 140 can transmit the broadcast viewing information to the server whose address corresponds to the address information included in the transmission request message immediately upon receipt of the transmission request message. The transmitting unit 140 can transmit the broadcast viewing information independently of the previously set or configured transmission cycle.

In this case, the control unit 130 can transmit the broadcast viewing information to a broadcast managing server whose address corresponds to the previously set address information according to the preset transmission cycle, which is separate from the step of transmitting the broadcast viewing information corresponding to the transmission request message.

The above-explained present invention is applicable to all kinds of terminals that can be implemented in such a digital broadcasting system as DMB (digital multimedia broadcasting), DVB-H (digital video broadcast-handheld), Media FLO (forward link only), and the like.

Accordingly, the present invention provides the following effects or advantages.

First, since a transmission cycle of broadcast viewing information is adjustable according to a request made by a broadcast managing server, a mobile communication terminal is able to provide the broadcast viewing information in a cycle requested by the broadcast managing server.

Second, as a request for transmitting broadcast viewing information is made by a broadcast managing server, the broadcast viewing information can be immediately transmitted separately from a currently set transmission cycle. Hence, a mobile communication terminal is able to provide broadcast viewing information immediately at a timing point specified by the broadcast managing server.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal capable of transmitting broadcast viewing information, the mobile communication terminal comprising:
    a broadcast module configured to receive a broadcast program;
    an information collecting unit configured to collect and manage the broadcast viewing information for the received broadcast program;
    a transmitting unit configured to transmit the broadcast viewing information according to a transmission cycle;
    a receiving unit configured to receive a change request message including an adjustment value for the transmission cycle and address information for a broadcast managing server; and
    a control unit configured to change the transmission cycle according to the adjustment value included in the change request message, set the broadcast managing server corresponding to the address information included in the change request message as the broadcast managing server to receive the broadcast viewing information, and control the transmitting unit to transmit the broadcast viewing information according to the changed transmission cycle to the broadcast managing server corresponding to the address information included in the change request message wherein the broadcast module, the information collecting unit, the transmitting unit, and the receiving unit are operably coupled to the control unit in the mobile communication terminal,
    wherein the adjustment value for the transmission cycle is determined by the broadcast managing server and indicated by a unit of time or day such that a previously set transmission cycle is changed by adding or subtracting the time or day specified by the adjustment value, and
    wherein the change request message comprises parameters associated with the transmission cycle, the parameters comprising an interval field, and enable/disable field, a frequency field, and a link field.

2. The mobile communication terminal of claim 1, wherein the broadcast viewing information comprises at least one of viewing broadcast program information, viewing broadcast channel information, viewing time information by broadcast program, viewing time information by broadcast channel, and information for product purchase contents via broadcast program.

3. The mobile communication terminal of claim 1, wherein the adjustment value is defined by a interval field of the change request message.

4. The mobile communication terminal of claim 1, further comprising:
    a storage unit operably coupled to the control unit in the mobile communication terminal and configured to store at least one of information associated with the transmission cycle and address information for the broadcast managing server receiving the broadcast viewing information.

5. The mobile communication terminal of claim 4, wherein the receiving unit is further configured to receive a transmission request message for the broadcast viewing information from the broadcast managing server and wherein the control unit is further configured to control the transmitting unit to transmit the broadcast viewing information immediately upon receiving the transmission request message, independently from the transmission cycle.

6. The mobile communication terminal of claim 5, wherein the transmission request message includes address information for a server attempting to receive the broadcast viewing information and the address information in the transmission request message is identical to the address information for the broadcast managing server previously stored in the storage unit or corresponds to address information for a server newly requested by the transmission request message.

7. The mobile communication terminal of claim 6, wherein the control unit is further configured to:
    determine whether the address information in the transmission request message matches the previously stored address information;
    store the address information for the newly requested server in the storage unit upon determining that the address information in the transmission request message does not match the previously stored address information;
    set the stored address information for the newly requested server as address information for a server to which the broadcast viewing information is to be transmitted; and
    control the transmitting unit to transmit the broadcast viewing information to the server recognized from the stored address information for the newly requested server.

8. The mobile communication terminal of claim 6, wherein the address information is represented as a Uniform Resource Locator (URL).

9. A method of transmitting broadcast viewing information in a mobile communication terminal comprising a broadcast module, an information collecting unit, a transmitting unit, a receiving unit, a storage unit, and a control unit, the method comprising:
    receiving, by the broadcast module, a broadcast program;
    collecting and managing, by the information collecting unit, the broadcast viewing information for the broadcast program;
    receiving, by the receiving unit, a change request message including an adjustment value for a transmission cycle and address information for a broadcast managing server;
    changing, by the control unit, the transmission cycle according to the adjustment value included in the change request message;
    setting, by the control unit, the broadcast managing server corresponding to the address information included in the change request message as the broadcast managing server to receive the broadcast viewing information; and
    transmitting, by the transmitting unit, the broadcast viewing information according to the changed transmission cycle to the broadcast managing server corresponding to the address information included in the change request message,
    wherein the broadcast module, the information collecting unit, the transmitting unit, and the receiving unit are operably coupled to the control unit in the mobile communication terminal, wherein the adjustment value for the transmission cycle is determined by the broadcast managing server and indicated by a unit of time or day such that a previously set transmission cycle is changed by adding or subtracting the time or day specified by the adjustment value, and wherein the change request message comprises parameters associated with the transmission cycle, the parameters comprising an interval field, and enable/disable field, a frequency field, and a link field.

10. The method of claim 9, wherein the broadcast viewing information comprises at least one of viewing broadcast program information, viewing broadcast channel information, viewing time information by broadcast program, viewing time information by broadcast channel, and information for product purchase contents via broadcast program.

11. The method of claim 9, wherein the adjustment value is defined by a interval field of the change request message.

12. The method of claim 9, further comprising:
receiving, by the receiving unit, a transmission request message for the broadcast viewing information from the broadcast managing server; and
transmitting, by the transmitting unit, the broadcast viewing information independently from the transmission cycle in response to the transmission request message, wherein the transmission request message includes server address information for a server attempting to receive the broadcast viewing information.

13. The method of claim 12, wherein the broadcast viewing information is transmitted to the server recognized from the server address information included in the transmission request message immediately upon receiving the transmission request message, independently from the transmission cycle.

14. The method of claim 12, wherein the server address information in the transmission request message is identical to the address information for the broadcast managing server previously stored in the storage unit or corresponds to address information for a server that is not the broadcast managing server, the server transmitting the broadcast program.

15. The mobile communication terminal of claim 1, wherein the broadcast viewing information is transmitted to the managing server via a return channel comprising a mobile communication channel or a broadcast channel.

16. The mobile communication terminal of claim 15, wherein the broadcast viewing information is transmitted to the managing server via the mobile communication channel.

17. The mobile communication terminal of claim 1, wherein the broadcast managing server transmits the broadcast program to the mobile communication terminal.

18. The mobile communication terminal of claim 1, wherein the broadcast managing server is not the same as a server transmitting the broadcast program to the mobile communication terminal.

19. The mobile communication terminal of claim 1, wherein the transmission cycle that is used to transmit the broadcast viewing information prior to being changed according to the adjustment value is set by a user.

* * * * *